US009645617B2

(12) United States Patent
Martinez et al.

(10) Patent No.: US 9,645,617 B2
(45) Date of Patent: May 9, 2017

(54) COMPACT MEMORY DEVICE

(71) Applicants: Renae Martinez, Lake Zurich, IL (US); Anthony J. Zychal, Downers Grove, IL (US); Meredith L. Chow, Gurnee, IL (US)

(72) Inventors: Renae Martinez, Lake Zurich, IL (US); Anthony J. Zychal, Downers Grove, IL (US); Meredith L. Chow, Gurnee, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 662 days.

(21) Appl. No.: 14/073,432

(22) Filed: Nov. 6, 2013

(65) Prior Publication Data

US 2015/0124391 A1      May 7, 2015

(51) Int. Cl.
*G01K 1/14*   (2006.01)
*G06F 1/18*   (2006.01)
*G06F 1/20*   (2006.01)

(52) U.S. Cl.
CPC .............. *G06F 1/182* (2013.01); *G06F 1/206* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,981,446 A * | 1/1991 | Lazaro, Jr. | ......... | H01R 13/5208 439/275 |
| 5,703,542 A * | 12/1997 | Blandino | ................ | H03L 1/028 331/158 |
| 7,247,056 B2 | 7/2007 | Zauber | | |
| 7,775,834 B2 | 8/2010 | Zauber et al. | | |
| 8,032,014 B2 | 10/2011 | Cheung | | |
| 8,718,981 B2 * | 5/2014 | Bey | ...................... | G01D 11/245 700/66 |

(Continued)

OTHER PUBLICATIONS

Apro Co., Ltd.: Hammer-D Series, Industrial Rugges Metal USB Flash Disk Generation 4, http://www.apro-tw.com/Databank/2010_catalog_specsheet/SingleProduct/09_USB/HAMMER-D_Industrial%20Rugged%20Metal%20UFD_G4.pdf.

*Primary Examiner* — Lisa Caputo
*Assistant Examiner* — Nasir U Ahmed
(74) *Attorney, Agent, or Firm* — Tarolli, Sundheim, Covell & Tummino LLP

(57) ABSTRACT

A memory device comprising a temperature sensor mounted on a surface of a substrate, the temperature sensor in electrical communication with a heating element and configured to activate the heating element in response to detecting a temperature below a predetermined temperature threshold. The heating element is in thermal communication with a solid state memory configured to store computer readable data. A universal serial bus (USB) driver is also mounted to the substrate, in electrical communication with the memory, and configured to communicate with another USB device via a USB channel in order to transfer data to and from the memory. The memory device can be enclosed in a protective backshell canister connected to the MIL-DTL-38999 type connector to provide a fully ruggedized, fully sealed device to withstand and operate effectively in extreme environmental conditions.

20 Claims, 3 Drawing Sheets

(56) References Cited

U.S. PATENT DOCUMENTS

| | | | |
|---|---|---|---|
| 2005/0270359 A1* | 12/2005 | Katsuma | B41J 2/365 |
| | | | 347/185 |
| 2006/0068644 A1* | 3/2006 | Zauber | H05K 7/1434 |
| | | | 439/654 |
| 2006/0104330 A1* | 5/2006 | Ho Limb | G01K 7/223 |
| | | | 374/1 |
| 2009/0141771 A1* | 6/2009 | Owen | G01K 1/14 |
| | | | 374/178 |
| 2010/0307916 A1* | 12/2010 | Ramey | A61B 5/14532 |
| | | | 204/402 |
| 2012/0170608 A1* | 7/2012 | Bianchessi | G01K 15/00 |
| | | | 374/1 |
| 2013/0107905 A1* | 5/2013 | Campbell | G01F 25/0007 |
| | | | 374/1 |

* cited by examiner

COMPACT MEMORY DEVICE

This invention was made with Government support under Contract No. H94003-04-D-0004. The Government has certain rights in this invention.

TECHNICAL FIELD

This disclosure relates to a compact electronic memory device. More particularly, this disclosure relates to a compact electronic memory device configured to withstand and operate effectively in harsh environments.

BACKGROUND

Under harsh environmental conditions, consumer grade electronic devices typically are unable to withstand extremes of temperature, shock, vibration, humidity, dust, as well as exposure to chemicals or other types of explosive environments. In military as well as aeronautical and industrial applications, compact memory devices have become a necessary tool in collecting and providing information. However, the extreme environmental conditions in which these systems operate can lead to damaged equipment or degraded performance, making standard electrical devices inoperable for such applications.

SUMMARY

In one example, a memory device is disclosed with a temperature sensor mounted on a substrate, the temperature sensor in electrical communication with a heating element and configured to activate the heating element in response to detecting a temperature below a predetermined temperature threshold. Further, the heating element is in thermal communication with a solid state memory configured to store computer readable data.

In another example, a universal serial bus (USB) driver is also mounted to the substrate, in electrical communication with the memory, and configured to communicate with another USB device via a USB channel in order to transfer data to and from the memory.

In still another example, the memory device can be enclosed in a protective backshell canister, connected to a MIL-DTL-38999 type connector to provide a fully ruggedized, fully sealed device to withstand and operate effectively in extreme environmental conditions, such as extreme temperatures, atmospheric variations, high shock, high vibration, excessive humidity, dust, chemical exposures and explosive environments.

DETAILED DESCRIPTION

This disclosure relates to a compact memory device. More specifically, the compact memory device can be a military-grade removable universal serial bus (USB) device. The memory device incorporates a fully enclosed set of integrated components, thereby reducing space requirements for adapters and additional elements, making the compact configuration more durable. The compact military-grade removable USB device is a ruggedized, fully enclosed and sealed USB device that can withstand extreme conditions and operate effectively in harsh environments. Environmental conditions can include extreme cold or hot temperatures, rapid atmospheric variations, intense shock and vibration, excessive humidity, dust, chemical exposures, and other types of explosive environments.

Figure 1:
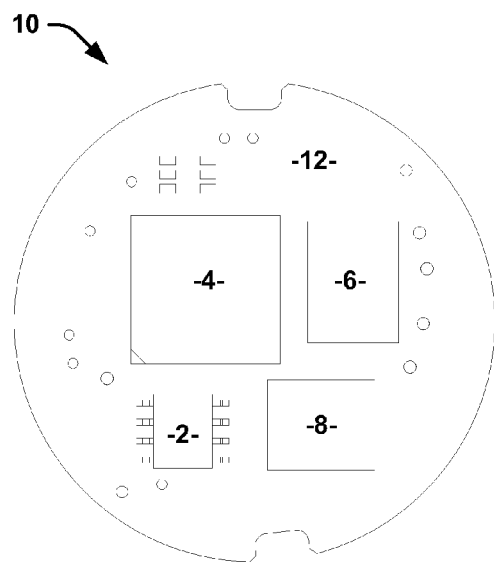
FIG. 1 illustrates an example of a compact memory device.

FIG. 1 illustrates an example of a compact electronic memory device 10 with a memory 2 secured to a substrate 12. The substrate 12 can be substantially flat and circular in shape, configured for mounting and connecting components as well as enabling electrical and thermal communication between the various components. The substrate 12 can be, for example, a printed circuit board (PCB). Additionally, the substrate 12 is configured to accept one or more conductive leads to provide bi-directional signal pathways between components mounted on the substrate 12 and external components. As an example, the memory device 2 can be mounted on a surface of the substrate 12. The memory device 2 can be a mass storage device to store computer readable data. Design considerations for the particular application, for example, size and temperature constraints can be determining factors for the type of memory device employed. A solid state mass storage device, such as a non-volatile flash memory type, is an example of a compact and rugged form of memory device. Further, an integrated circuit (IC) containing components for storing computer readable data could also be employed.

A USB device 4 can also be mounted on the substrate 12 in proximity to the memory 2 to provide communication with a host device. The USB device can communicate with a host device via a USB channel (e.g., data communicated via over a USB bus). The USB driver 4 can be configured to detect a predetermined protocol level mode of a data signal propagated on the USB channel, such as the High-Speed USB protocol. The USB mass storage device class is a protocol that allows a USB device to become accessible to the host device to enable data transfer between the two. To the host device, the USB device 4 and attached memory device 2 appear similar to an external hard drive. The USB mass storage device class of memory devices comprises a set of computing communications protocols defined by the USB Implementers Forum that run on the Universal Serial Bus. Thus, the standard provides an interface for a variety of storage devices, ensuring the compact memory device is compatible with a range of computing platforms. Although in this example a bi-directional serial communication channel is described as a USB channel, other serial communication channels could be employed.

The substrate 12 can further include a temperature sensor 8 in electrical communication with a heating element 6. The temperature sensor 8 can be set to activate the heating element 6 upon detecting an ambient temperature below a predetermined temperature threshold. For example, one or more components of a particular circuit may experience degraded performance below −40 degrees Celsius. Thus, to ensure the circuit is fully functional below −40 degrees Celsius, the temperature sensor 8 can be configured to activate the heating element 6 upon breaching the temperature threshold. Moreover, when the temperature rises above the predetermined threshold, the temperature sensor 8 can deactivate the heating element 6. The heating element 6 can have conductive leads that are connected to the host device which provides current for the heating element 6 when the temperature sensor 8 is activated. Thus, heating element 6 can be one of a variety of heating devices, for example, an electrically connected resistive heating element. To ensure the various components of the memory device 10 are properly heated, the heating element 6 can be configured to maximize thermal transfer. For instance, if the heating element 6 is a resistive wire, the wire can be mounted on the substrate 12 in a variety of patterns to accommodate the number and placement of the components thereon. The wire can define a perimeter of the substrate 12, or can trace a path around the components, for example. Alternatively, the heating element 6 may be centralized and in thermal communication with the central borders of the various components. Moreover, the heating element 6 can take a substantially circular shape to cover one or both surfaces of the memory device 10.

Accordingly, what has been described in FIG. 1 is a compact memory device comprising a memory, a heating element, a temperature sensor, and a USB driver, secured to a circular printed circuit board for bi-directional communication with a host device.

Figure 2:
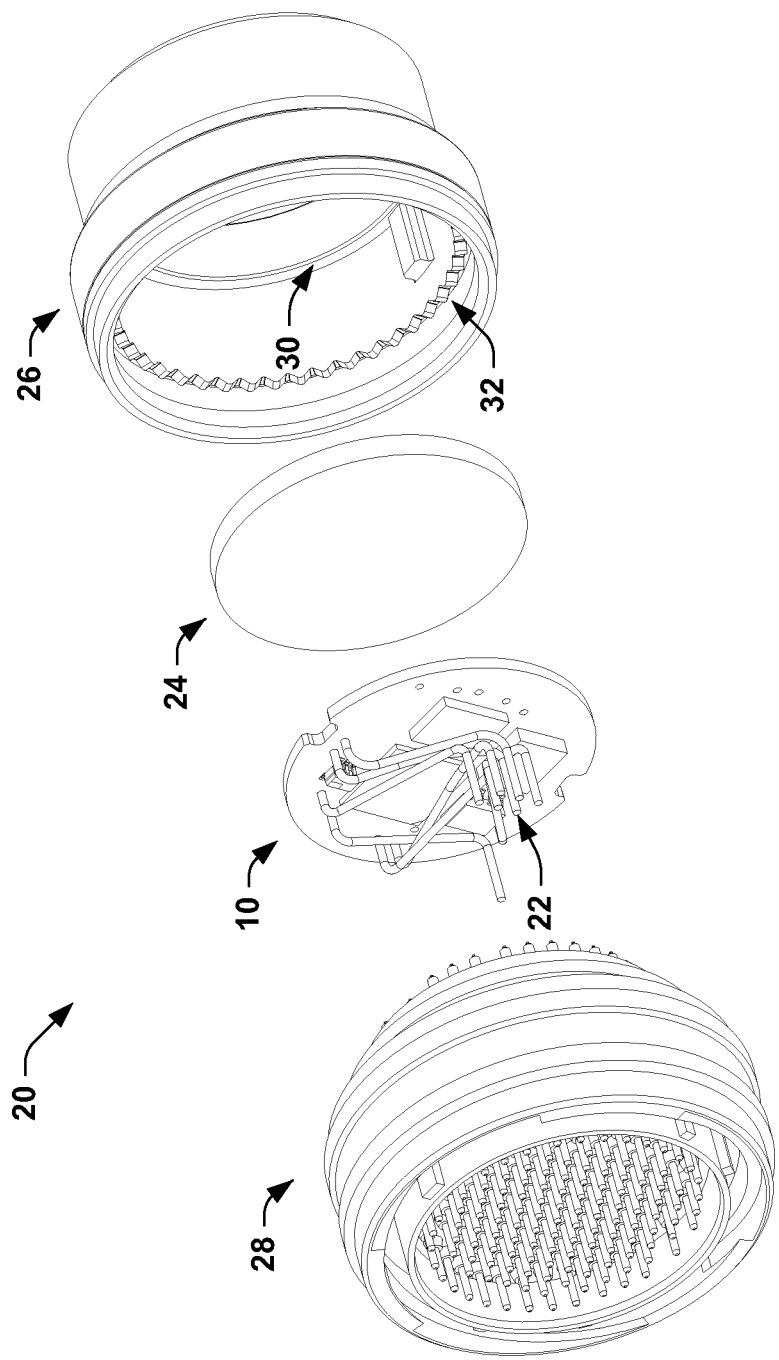
FIG. 2 illustrates an example of an integrated compact electronic memory device.

FIG. 2 illustrates an example of an integrated, compact, rugged memory system 20 that incorporates the memory device 10 into a connector configured to connect to a host device. The integrated system 20 can be constructed to conform to military grade specifications for durability and performance by, for example, securing the removable USB device in a corrosive-proof, protective backshell canister 26. The canister 26 can be mated with a corrosive proof military-type connector 28. The canister 26 and connector 28 can be constructed from a material suited for the desired application, including aluminum, steel, polymers, or other appropriate material. For purposes of simplification of explanation, FIG. 2 illustrates an integrated connector system 20 employing a MIL-DTL-38999 standard connector, although various alternative connectors suitable for military, industrial and aeronautical applications will be appreciated by one of ordinary skill in the art.

The MIL-DTL-38999 standard describes four series of miniature, high density, bayonet, threaded or breech coupling, circular, environment resistant, electrical connectors using removable crimp or fixed hermetic solder contacts. The connectors are intended for a variety of uses where harsh environmental conditions require rugged components and are capable of operation within a temperature range of about −65 degrees Celsius to about +200 degrees Celsius. Series I connectors are used where a quick disconnect coupling system is required for blind mating or other mating problem areas. These connectors provide high-vibration characteristics and are suitable for severe wind and moisture problem (SWAMP) areas with proper connector accessories. Series II connectors are used where the connector is not subjected to high vibration or SWAMP areas. Series III connectors are suitable for blind mating areas, and provide high-vibration characteristics at elevated temperature, and are also suitable for SWAMP areas with the proper connector accessories. Series IV connectors are also used where a quick disconnect coupling system is required for mating problem areas, and these connectors provide high-vibration characteristics and are suitable for SWAMP areas.

Thus, when the canister 26 is mated to the connector 28, the contents of the integrated system 20 are fully enclosed and sealed from environmental conditions. The canister 26, which has a substantially cylindrical shape, houses the circular memory device 10. The memory device 10 is secured in a fixed position inside the backshell canister which serves to stabilize the memory device 10 within the sealed environment. Additionally, an electromagnetic interference (EMI) gasket 24 can be mated on the surface of the memory device 10 that faces away from the connector in order to shield the memory device 10 from EMI.

As illustrated in FIG. 2, the canister 26 has one sealed end and one opening. The canister 26 has a first interior border 30 circling the inner surface of the canister 26 located between the sealed end and the opening that serves as a lip for securing the gasket 24. The gasket 24 can be secured to the first interior border 30 by application of an adhesive, by soldering, or by mechanical or other suitable means. A second interior border 32 is located on the inner surface of the canister 26 between the first interior border 30 and the opening of the canister 26. The memory device 10 can be secured to the second interior border 32 of the canister 26 in a fashion similar to that of the gasket 24. The canister 26 is then fitted with a series of sealing plugs configured to align with the MIL-DTL-38999 connector 28 or other suitable connector and serve as conductive pathways between the components mounted to the substrate 12 and a host device. The canister 26 is then mated with the connector 28 to provide an integrated system 20 that is fully sealed and enclosed, protecting the contents from harsh environmental conditions, allowing uninterrupted use.

The memory device 10 can include a plurality of electrical leads 22 that can connect various electrical components mounted on the memory device 10 to the connector 28 through a series of sealing plugs. As shown in FIG. 1, the memory device 10 can include electrical components such as non-volatile memory 2 that retains data, a USB driver 4 that reads and writes data to the non-volatile memory 2, a temperature sensor 8 that detects and measures the ambient temperature, and a heating elements 6 that heats the memory device 10 when the surrounding temperature breaches a predetermined minimum threshold. The minimum temperature threshold can be, for example −40 degrees Celsius, activating the heating element 6 to ensure that the memory 2 on the memory device 10 is fully functional at extremely cold temperatures (e.g., −54 degrees Celsius). The memory device 10 is further constructed to be operable at temperatures of at least up to +85 degrees Celsius. For instance, if a compact military grade removable memory device, such as memory device 10, is operating in an environment that has an ambient air temperature of −40 degrees Celsius, the temperature sensor 8 will sense the ambient air temperature and determine that electrical power to a heating element 6 should be applied. In response, the heating element 6 will heat the memory device 10 to ensure the full functionality of the integrated system 20 is retained. By retaining full functionality of the integrated system 20, data can be read and written to the non-volatile memory without any disturbance or failure even in extremely cold conditions.

As further protection, the memory device 10 can be encapsulated in a temperature resistant potting material, including, but not limited to, polyurethane, silicone, acrylic, and foam. The potting material can ensure that the electrical elements are sufficiently protected from corrosive elements, as well as protected from vibration and temperature related damage. Thus, the compact memory system is configured to be fully operative in harsh environments, capable to read and write data to the non-volatile memory at temperatures well below −40° C.

As noted, in one example, the integrated system 20 can communicate with other devices by the USB protocol. In operation, bi-directional serial bus drivers can communicate with a standard USB connection such as a connection at "Low Speed" (defined by the USB 1.0 standard) at data rates up to 1.5 megabits per second (Mb/s), "Full Speed" (defined by the USB 1.0 standard) at data rates up to 12 Mb/s, "High-Speed" (defined by the USB 2.0 standard) at data rates up to 480 Mb/s or the High-Speed component of a "SuperSpeed" connection (defined by the USB 3.0 standard) at data rates up to 5 Gigabits per second (Gb/s). Additionally or alternatively, bi-directional serial bus drivers can communicate through a standard such as "USB On-The-Go" or "Battery Charging".

Figure 3:
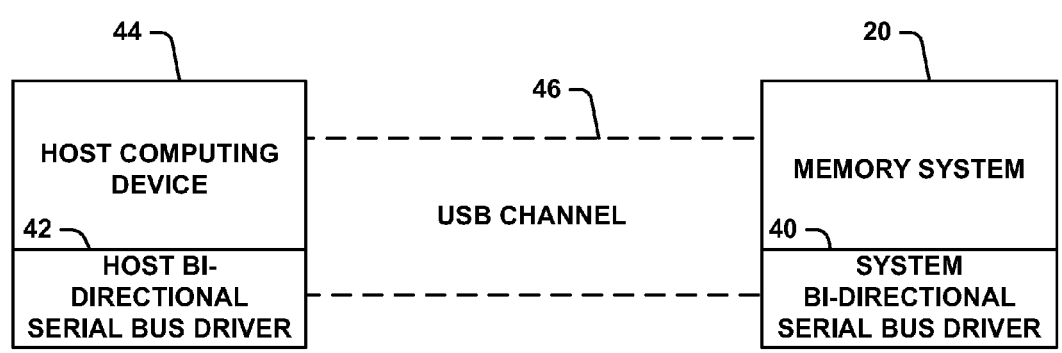
FIG. 3 illustrates an example of a system with a bi-directional serial bus coupled to a USB coupled to a host computer.

FIG. 3 illustrates an example of a system coupled to a host device 44. The host device 44 can be a computing platform capable of processing computer executable instructions or other device configured for communication with the integrated system 20. A USB channel 46 can facilitate communication between the host device 44 and the integrated system 20 by way of a host bi-directional serial bus driver 42 and a system bi-directional serial bus driver 40. In one example, the host device 44 can act as a master USB device and the integrated system 20 can be a slave USB device. Moreover, in some examples, the USB device that is assigned the role of "host" can dynamically change, such as with the employment of the USB On-The-Go protocol level mode.

To implement bi-directional USB communication, the system driver 40 can communicate with the host driver 42 through a USB channel 46. The system driver 40 and the host driver 42 can each be implemented, for example, as a USB port. In some situations, the host and system drivers 40 and 41 can communicate in one of a plurality of different protocol level modes.

The host device 44 can include a USB driver that can detect a protocol level mode employed in bi-directional serial communication. As used herein, the term "protocol level mode" can indicate a communication protocol and a data speed, such as the aforementioned Low Speed, Full Speed, High-Speed, SuperSpeed, USB On-The-Go or Battery Charging protocol level modes. The USB driver can be implemented, for example, as a hardware device, a firmware device, or a combination thereof. For instance, in some examples, the USB driver can be implemented as a printed circuit, application-specific integrated circuit (ASIC) chip, a field programmable gate array (FPGA), or the like. In other examples, the USB driver can be implemented with firmware such as a microcontroller with machine readable instructions programmed in a non-transitory computer readable memory.

Although the examples have been described employing the USB protocol, in other examples where the bi-directional serial communication channel does not comply with the USB standards, the predetermined protocol level mode could be different. In such a situation, the USB driver can be replaced with a state machine that can detect the predetermined protocol level mode by analyzing waveforms of the data signal, such that the state machine does not need to analyze the data of packets transmitted on the bi-directional serial communication channel.

Figure 4:
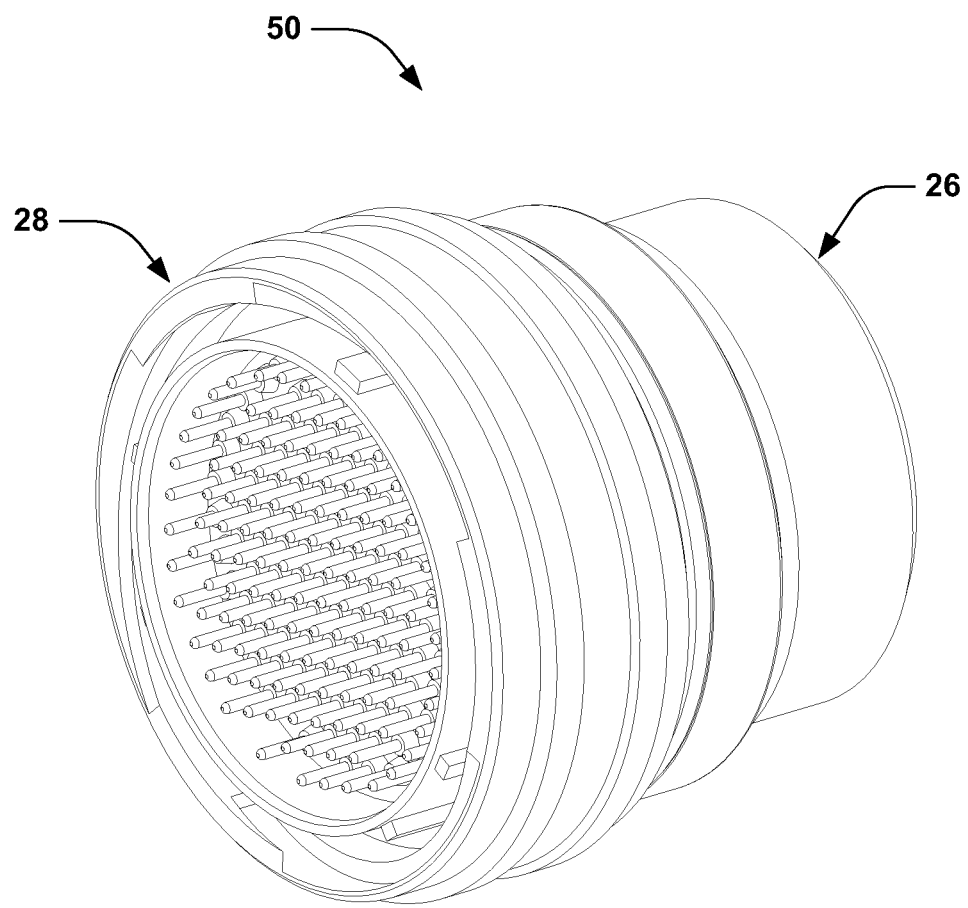
FIG. 4 illustrates an example of an assembled compact memory system.

FIG. 4 illustrates an example of a system where the backshell canister 26 is mated with the connector 28. The resulting integrated system thus takes a substantially cylindrical shape, with one end configured to mate with a designated LRU. The complete system, configured as described herein, able to fit in a space less than 3 inches, is of a size that is large enough to house any needed components and to be secured to the host manually without special tools, while being compact enough to limit contact with other devices or moving parts.

The integrated system 20 can be mated with a Line Replaceable Unit (LRU) via the corrosive proof military-type of grade connector. Thus, a user can effectively read and write data from systems that employ the LRU, such as aircraft and military vehicles and equipment that are commonly exposed to extreme environmental conditions. An LRU is a modular component of an airplane, ship or spacecraft or any other manufactured device that is designed to be replaced quickly at an operating location. An LRU is usually a sealed unit designed to comply with a set of specifications to assure that they can be interchanged, especially if they are from different manufacturers. Usually a class of LRUs will have coordinated environmental specifications (e.g., temperature, condensation). In the military, electronic LRUs are typically designed to interface according to data bus standards, such as MIL-STD-1553.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A memory device comprising:
    a backshell canister, wherein the backshell canister comprises:
        a substrate having a temperature sensor, a heating element, a universal serial bus (USB) driver and a solid state memory to store computer readable data mounted thereon,
        wherein the temperature sensor is in electrical communication with the heating element and wherein the temperature sensor configured to:
            activate the heating element in response to detecting a temperature at the surface of the substrate that is below a predetermined temperature threshold; and
            deactivate the heating element in response to detecting a temperature at the surface of the substrate that is at or above the predetermined temperature threshold;
        wherein the heating element is in thermal communication with a solid state memory mounted on the substrate configured to store computer readable data; and
    a connector mated to the backshell canister, wherein the mated connector and backshell canister provide a protective enclosure to shield the contents from environmental conditions.

2. The memory device of claim 1, wherein the substrate is a printed circuit board.

3. The memory device of claim 1, wherein the USB driver is in electrical communication with the solid state memory.

4. The memory device of claim 3, wherein the USB driver is configured to operate on a predetermined protocol level mode.

5. The memory device of claim 4, wherein the predetermined protocol level mode is the High-Speed USB protocol.

6. The memory device of claim 5, wherein the USB driver is configured to communicate with another USB device via a USB channel in order to transfer data to and from the solid state memory.

7. The memory device of claim 1, wherein the predetermined temperature threshold is about −40 degrees Celsius.

8. The memory device of claim 1 configured to operate in a temperature range from about −54 degrees Celsius to about +85 degrees Celsius.

9. The memory device of claim 1, further comprising an electromagnetic interference (EMI) gasket, the EMI gasket positioned proximal to a side of the substrate to shield the substrate from EMI.

10. The memory device of claim 1, wherein the connector is a MIL-DTL-38999 type connector.

11. The memory device of claim 10, wherein outer edges of the substrate are adhered to an interior edge of the backshell canister.

12. The memory device of claim 11, wherein the protective backshell canister and the-MIL-DTL-38999 type connector provide a fully ruggedized, fully enclosed, sealed device to withstand and operate effectively in at least two of extreme temperatures, atmospheric variations, high shock, high vibration, excessive humidity, dust, chemical exposures and explosive environments.

13. The memory device of claim 1, wherein one or more leads from the substrate to external components are routed proximal to the heating element to facilitate thermal conduction.

14. The memory device of claim 1, wherein the substrate is encapsulated by a temperature resistant potting material.

15. The memory device of claim 1, wherein the heater is a resistive heater.

16. A system comprising:
a backshell canister, wherein the backshell canister comprises:
    a substrate to mount one or more electrical components, each electrical component connected to at least one other electrical component, wherein the electrical components include a temperature sensor, a heating element, a universal serial bus (USB) driver and a solid state memory to store computer readable data, wherein the temperature sensor is in electrical communication with the heating element and configured to:
        activate the heating element in response to detecting a temperature at the surface of the substrate that is below a predetermined temperature threshold; and
        deactivate the heating element in response to detecting a temperature at the surface of the substrate that is at or above the predetermined temperature threshold, the heating element in thermal communication with the solid state memory; and
    a connector mated to the backshell canister, wherein the mated connector and backshell canister provide a protective enclosure to shield the contents from environmental conditions.

17. The system of claim 16, further comprising a universal serial bus (USB) device that communicates with another USB device via a USB channel in order to transfer data to and from the solid state memory.

18. The system of claim 17, wherein the USB device operates on a predetermined protocol level mode that is the High-Speed USB protocol.

19. The system of claim 16, wherein the connector is a MIL-DTL-38999 type connector.

20. A compact rugged USB memory system comprising:
a backshell canister, wherein the backshell canister comprises:
    a substrate to mount one or more electrical components, each electrical component connected to at least one other electrical component, the electrical components including a temperature sensor in electrical communication with a heating element, and a universal serial bus (USB) driver in electrical communication with a solid state memory to store computer readable data, wherein the temperature sensor is configured to:
        activate the heating element in response to detecting a temperature at the surface of the substrate that is below a predetermined temperature threshold; and
        deactivate the heating element in response to detecting a temperature at the surface of the substrate that is at or above the predetermined temperature threshold, and wherein the heating element is in thermal communication with the solid state memory;
    a gasket proximal to the substrate to shield the substrate from electromagnetic interference; and
    a series of leads in electrical communication with the electrical components, the series of leads being routed from a side of the substrate opposite the gasket to provide communication with another USB device; and
a MIL-DTL-38999 type connector mated to the backshell canister to provide a fully ruggedized, fully enclosed, sealed device to withstand and operate effectively in at least two of extreme temperatures, atmospheric variations, high shock, high vibration, excessive humidity, dust, chemical exposures and explosive environments.

* * * * *